May 20, 1958 G. M. VOGEL 2,835,041
MEASURING DEVICE
Filed Oct. 31, 1956 2 Sheets-Sheet 1
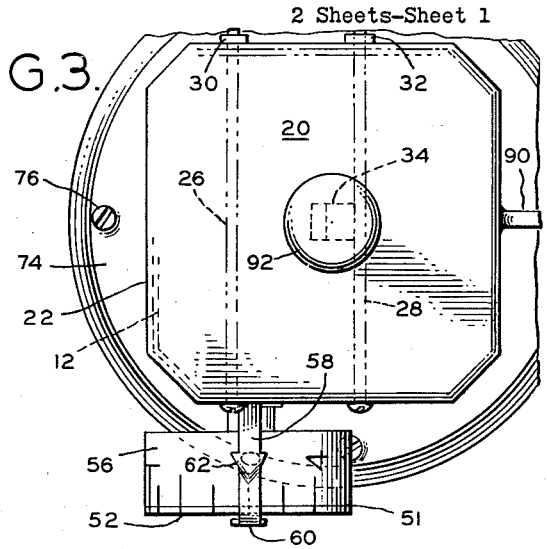
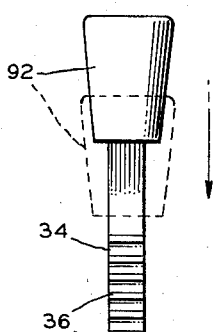
INVENTOR
GEORGE M. VOGEL
BY Gustave Miller
ATTORNEY May 20, 1958 G. M. VOGEL 2,835,041
MEASURING DEVICE
Filed Oct. 31, 1956 2 Sheets-Sheet 2

INVENTOR
GEORGE M. VOGEL
BY Gustav Miller
ATTORNEY though this invention has been described in considerable detail, such description is intended as being illustrative rather than limiting, since the invention may be variously embodied, and the scope of the invention is to be determined as claimed.

United States Patent Office 2,835,041
Patented May 20, 1958

2,835,041

MEASURING DEVICE

George M. Vogel, Sligo, Pa.

Application October 31, 1956, Serial No. 619,625

5 Claims. (Cl. 33—172)

This invention relates to a device for measuring thicknesses, and it particularly relates to a device for measuring the thickness of the asphalt layer on a road or the like.

Heretofore, after the asphalt has been poured on a roadbed, it was generally the procedure to insert a steel rule down into the asphalt and to then run a finger down to the top of the layer to measure the depth on the rule. However, freshly-poured asphalt is exceedingly hot, being usually of a temperature of between about 225° to 275° F. This results in burning and injury of the fingers unless great care is used. Furthermore, the procedure is awkward and not too accurate.

It is, therefore, one object of the present invention to provide a device which is adapted to accurately measure the depth of an asphalt layer or the like without danger of physical injury to the person taking the measurement.

Another object of the present invention is to provide a device for measuring the depth of a layer of asphalt or the like which is relatively simple in construction, highly accurate in operation, and easy to handle.

Other objects of the present invention are to provide an improved measuring device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Figure 1 is a front elevational view of a device embodying the present invention.

Fig. 2 is a side elevational view of the device of Fig. 1.

Fig. 3 is a top plan view of the device of Fig. 1.

Figures 4, 5:
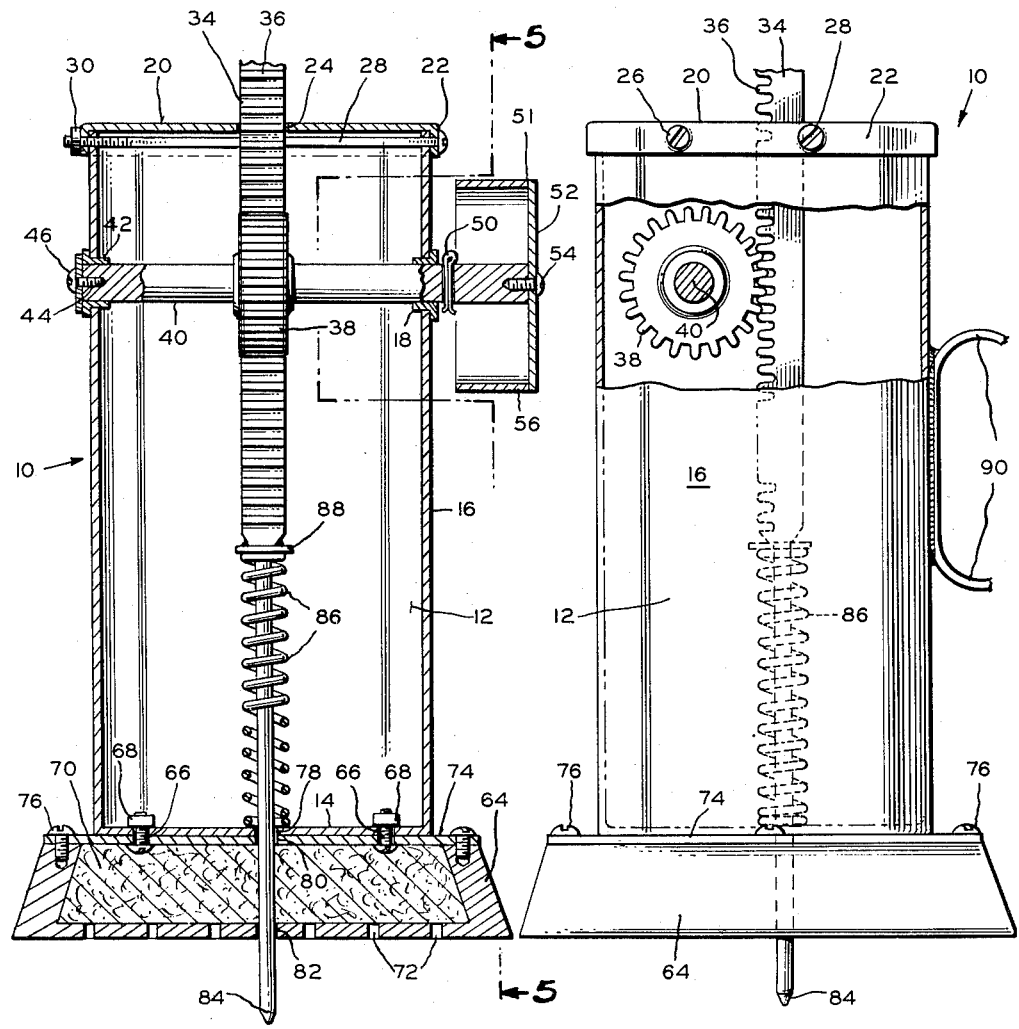
Fig. 4 is a sectional view of the device of Fig. 1.
Fig. 5 is a view, partly in elevation and partly broken away in section, of the device as taken on line 5—5 of Fig. 4.

Referring now in greater detail to the drawings wherein similar reference characters refer to similar parts, there is shown a measuring instrument, generally designated 10, comprising a vertical housing 12 having integral bottom wall 14 and side walls 16, and having an open top. The open top is provided with a closure lid 20 having a peripheral flange 22 and a central opening 24.

The lid 20 is releasably held on the housing 12 by a pair of elongated bolts 26 and 28 extending across the top opening in the housing. Nuts 30 and 32 hold these bolts in place. The bolt 28 extends along one side of opening 24 where it acts to laterally support a rack 34 extending through the opening 24.

The rack 34 is provided with teeth 36 which mesh with a pinion 38 within the housing, this pinion 38 being mounted on a rotatable shaft 40. This shaft 40 has one end rotatably mounted in a bushing 42 fixed in an opening at one side of the housing 12. This end of the shaft 40 is provided with a washer 44 held thereon by a screw 46.

This washer 44 acts to retain the bushing 42 in place. The opposite end of the shaft 40 extends outwardly of the housing 12 through a bushing 48, and is provided with a cotter pin 50 to retain the bushing in place. The extreme end of the shaft 40, outside the housing 12, is provided with an actuating wheel 51 including a dial face 52 held on the shaft 40 by a screw 54. An axial flange 56 extends rearwardly of the face 52, coaxial with the shaft. The wheel 51 and dial face assembly, including face 52 and flange 56, serve as a handle to rotate the shaft 40 and actuate the pinion 38 which, in turn, acts to move the rack 34 up or down, depending on the direction of rotation of the dial 52.

An indicator pointer 58 extends from the housing above the dial and is provided with one arrow 60, at its end, which extends down over the face 52, and a second arrow 62 overhanging the flange 56. Both the face 52 and the flange 56 are provided with an equal series of numerals, which coact with either pointer 60, as in the case of face 52, or pointer 62, as in the case of flange 56, to indicate the depth to which the rod (to be hereinafter described) descends. The dial face and flange are illustrated as being provided with a scale measured in inches and measuring 4¾ inches; however, the type and size of the scale may be varied as desired.

The housing 12 is attached to a base 64 by bolts 66 and nuts 68. This base 64 is hollow and is internally provided with packing 70 adapted to be impregnated with kerosene, fuel oil, or the like which acts as a solvent to clean the bottom of the base automatically. The solvent fluid functions to clean the bottom of the base by escaping through holes 72 in the bottom of the base. The base, itself, is made integral on the bottom and inclined sides and is provided with a releasable upper wall 74 retained by screws 76. The releasable top wall 74 permits the renewal of packing material and cleaning fluid when necessary.

The bottom wall 14 of the housing and both the upper and lower walls of the base are provided with coaxial, centrally-positioned openings 78, 80 and 82. Through these openings is adapted to pass a pointed rod 84, connected at its upper end to the lower end of the rack 34. A coil spring 86 surrounds the rod between a follower 88 and the bottom wall 14 of the housing.

A handle 90 is provided at one side of the housing 12 for ease in lifting and manipulating the entire unit. A knob 92 is provided on the upper end of the rack 34 to facilitate its operation.

In operation, the unit is laid, base down, on the asphalt surface, and the dial wheel is turned to actuate the rack which, in turn, moves the pointed rod 84 down into the asphalt, against the force of spring 86. When the bottom of the asphalt is reached, the depth thereof is indicated on the dial which has been rotated the corresponding amount. The operator can read the depth on the flange 56 while an inspector standing a distance away can read the indicated depth simultaneously on the face 52 of the dial.

When the reading has been obtained, the knob 92 is grasped and pulled up. This movement, which is aided by the force of spring 86, moves the rod 84 back into the housing through the packing 70 and its fluid, cleaning the same, and, at the same time, the rack 34 rotates the pinion 38 to, in turn, move the dial back to "zero" reading. As it moves through the base, the rod 84 is also cleaned by contact with the impregnated packing 70.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A measuring device comprising a housing, a base on which the housing is mounted, a pointed rod reciprocable through the housing and base, a rack connected to said rod, a pinion in mesh with said rack, said pinion being mounted on a shaft having an actuating wheel at one end outside the housing, a dial device on said wheel, handle means on said rack adapted to lift said rack and rod, said base being provided with a cleaning fluid, and dispensing means adapted to convey said cleaning fluid to the bottom of the base.

2. The device of claim 1 wherein a spring is positioned in said housing, said spring being constructed and arranged to bias said rod upwardly into said housing.

3. The device of claim 1 wherein said base is hollow and is provided with the cleaning fluid, said rod being arranged to contact said cleaning fluid in its passage through said base.

4. A measuring device comprising a vertical housing, an open top on said housing, a removable lid on said open top, means to releasably engage said lid with said housing, a vertical rack in said housing, a pointed rod connected to said rack and adapted to move through the bottom of said housing, a pinion in said housing in mesh with said rack, a dial device, outside said housing, rotatable with said pinion, a base on said housing, a vertical passage through said housing for said rod, means to contact a fluid cleaner with said rod as it passes through said base, said base being hollow and filled with packing material, said packing material being impregnated with a fluid cleaning means, and outlets for said fluid cleaning means on the bottom of said base.

5. The device of claim 4 wherein said dial device is provided with two indicating means, each being perpendicular to the other, one indicating means being on the dial device periphery for use by an operator handling said measuring device, and the other indicating means being on the face of the dial device for use by an operator located at a distance therefrom.

References Cited in the file of this patent

UNITED STATES PATENTS

| | | |
|---|---|---|
| 296,440 | Oliver | Apr. 8, 1884 |
| 1,436,111 | Reich | Nov. 21, 1922 |
| 1,928,528 | Gagnon | Sept. 26, 1933 |
| 2,061,094 | Thomas | Nov. 17, 1936 |
| 2,287,273 | Rabb | June 23, 1942 |
| 2,303,858 | Ostberg | Dec. 1, 1942 |
| 2,487,825 | Olvis | Nov. 15, 1949 |
| 2,675,620 | Whitcomb | Apr. 20, 1954 |

OTHER REFERENCES

U. S. Department of Agriculture Bulletin No. 949, Washington, October 10, 1921, pages 22 and 23.